Aug. 11, 1942.  S. MENDELSOHN  2,292,894
PHOTOFLASH SYNCHRONIZER
Filed July 26, 1940  3 Sheets-Sheet 1
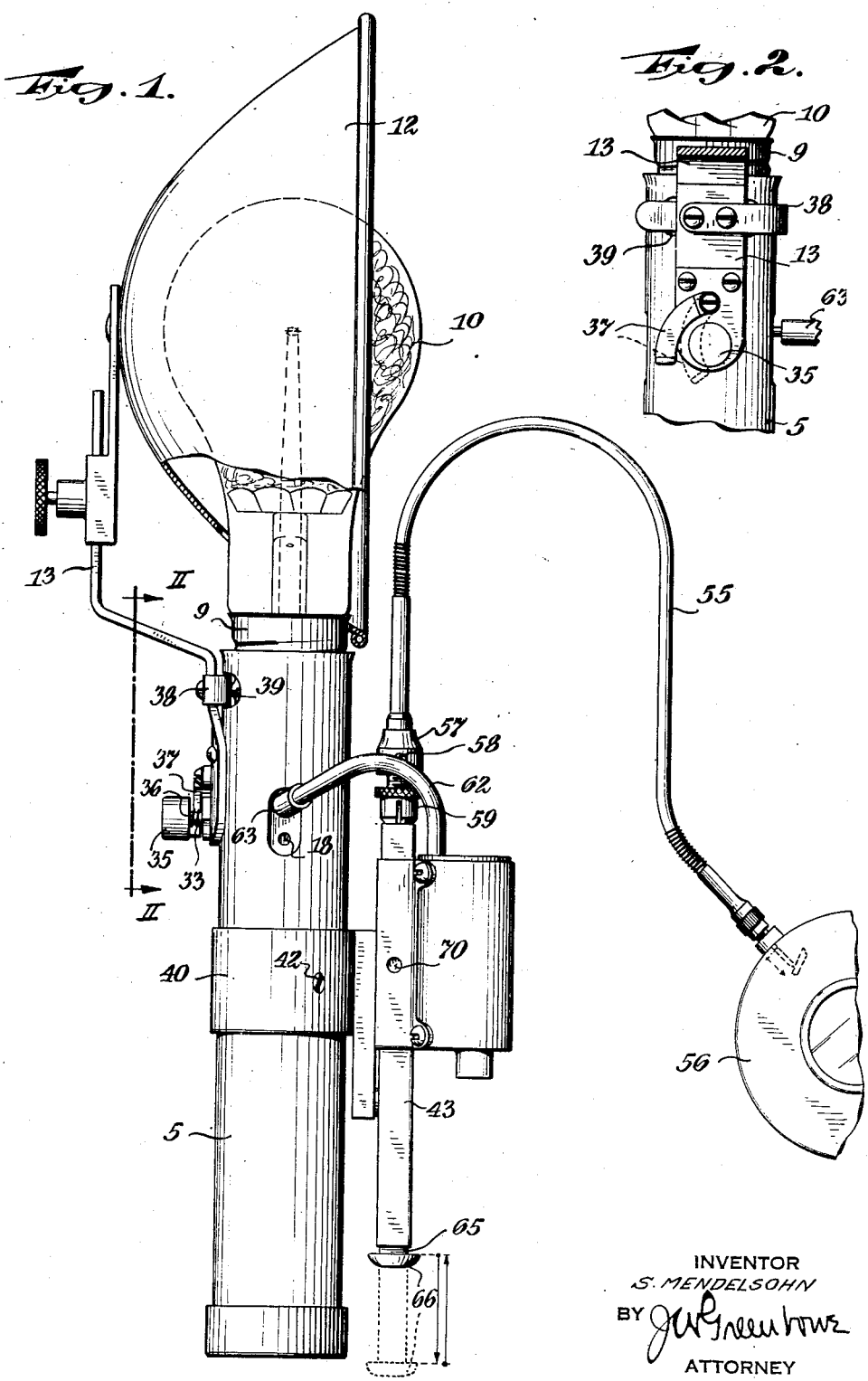
INVENTOR
S. MENDELSOHN
BY J W Greenhowe
ATTORNEY Aug. 11, 1942.  S. MENDELSOHN  2,292,894
PHOTOFLASH SYNCHRONIZER
Filed July 26, 1940  3 Sheets-Sheet 2
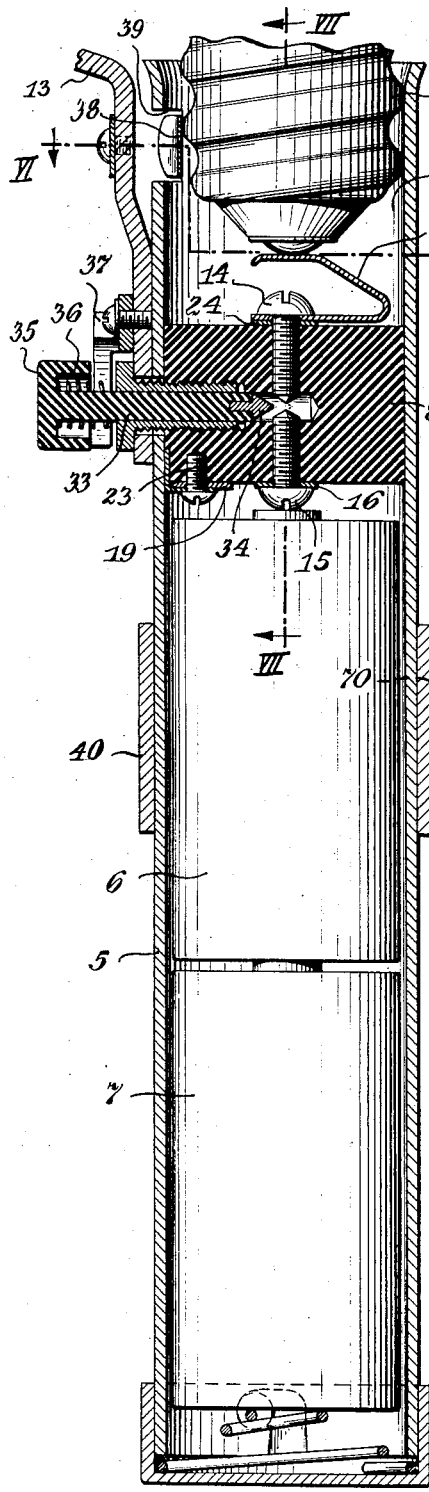
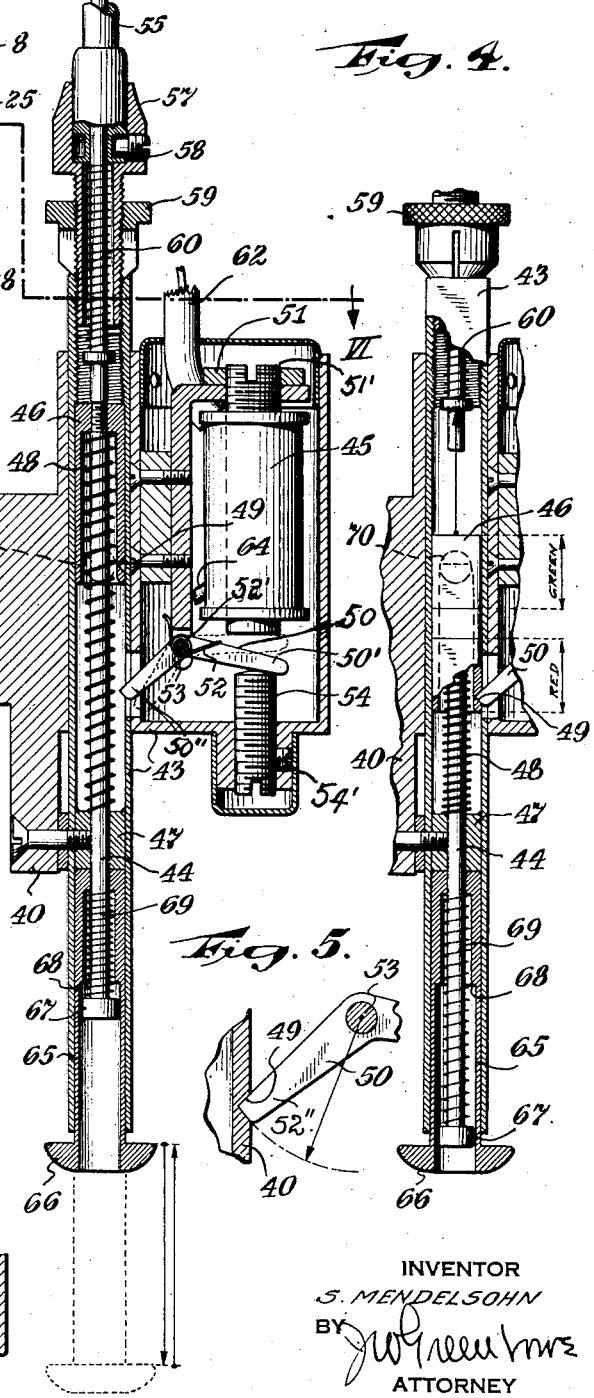
INVENTOR
S. MENDELSOHN
BY
ATTORNEY Aug. 11, 1942.　　　S. MENDELSOHN　　　2,292,894
PHOTOFLASH SYNCHRONIZER
Filed July 26, 1940　　　3 Sheets-Sheet 3
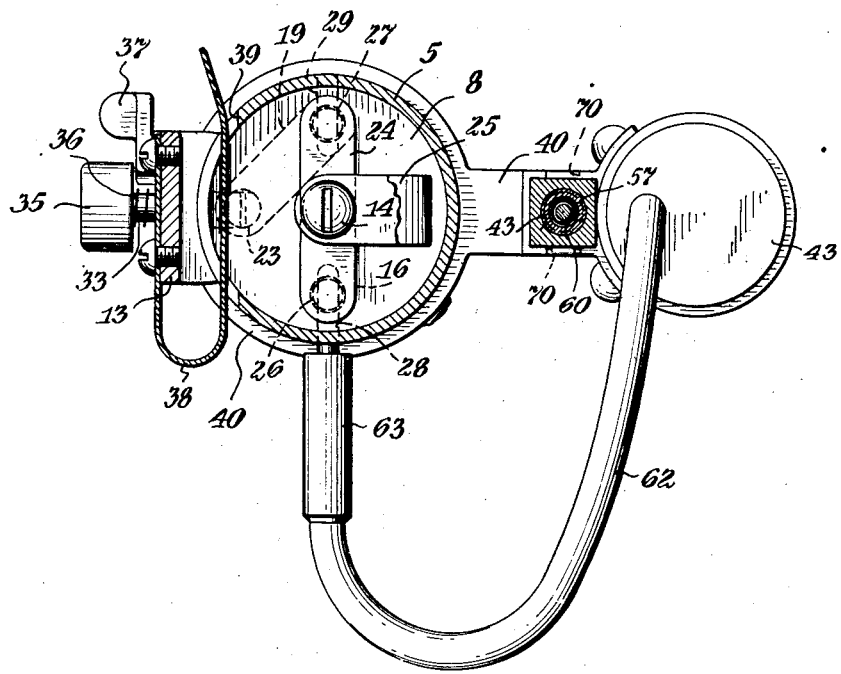
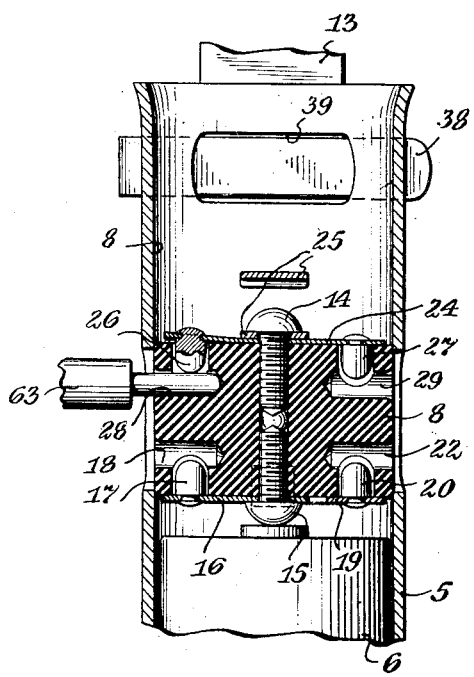
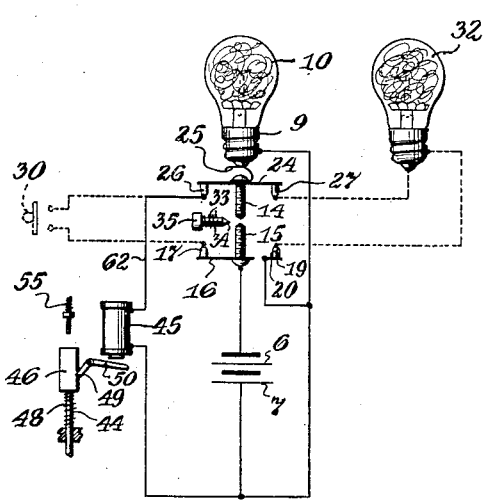
INVENTOR
S. MENDELSOHN
BY
ATTORNEY Patented Aug. 11, 1942

2,292,894

UNITED STATES PATENT OFFICE 2,292,894

PHOTOFLASH SYNCHRONIZER

Samuel Mendelsohn, Montclair, N. J.

Application July 26, 1940, Serial No. 347,571

6 Claims. (Cl. 67—29)

The present invention relates to camera synchronizers for completely opening the camera shutter simultaneously with the moment of peak intensity from a photoflash lamp and constitutes an improvement over the apparatus shown and claimed in my Patent No. 2,204,424, issued June 11, 1940.

Apparatus of this type is now well known in the art and it is customary to employ two dry cell batteries for supplying the electrical energy for flashing the lamp and operation of the shutter relay. Since the energy thus does not usually exceed a total of four volts it is desirable that all moving parts operate freely with friction reduced to a minimum. Moreover, the apparatus should be as compact as possible to prevent increasing the weight of the combined camera and synchronizer any more than absolutely necessary.

In my above noted patent a synchronizing apparatus is shown wherein a trigger member is actuated for effecting movement of a cable release to open the camera shutter simultaneously with flashing of the photoflash lamp. However, the trigger member, due to the frictional engagement thereof, requires the expenditure of considerable electrical energy to operate the cable release. Moreover, the apparatus must first be "cocked" to store potential energy, which so exposes part of the mechanism that its free operation can be too easily and inadvertently interfered with, thereby preventing complete movement.

It is accordingly an object of the present invention to provide a synchronizing apparatus for opening a camera shutter simultaneously with the moment of peak intensity from a photoflash lamp and wherein frictional engagement of the various parts is reduced to a minimum so that operation of the apparatus can be effected with a minimum amount of energy.

Another object of the present invention is the provision of a camera synchronizing apparatus wherein a trigger member is employed to retain the apparatus in condition for causing opening of a camera shutter simultaneously with the moment of peak intensity from a photoflash lamp and wherein operation of the trigger member is effected with the least possible expenditure of effort.

Another object of the present invention is the provision of a synchronizing apparatus for camera shutters for completely opening the latter simultaneously with the moment of peak intensity from a photoflash lamp and wherein all moving parts are entirely shielded so that their operation is in no way inadvertently impeded.

A further object of the present invention is the provision of a synchronizing apparatus for camera shutters for completely opening the latter simultaneously with the moment of peak intensity from a photoflash lamp and wherein the photoflash lamp may be hastily removed from the apparatus, and other lamps and controls readily connected thereto.

Still further objects of the present invention will become obvious to those skilled in the art by reference to the accompanying drawings wherein:

Fig. 1 is an elevational view of a synchronizing apparatus constructed in accordance with the present invention;

Fig. 2 is a side view of a portion of the apparatus and partly in cross-section as taken on the line II—II of Fig. 1 and looking in the direction indicated by the arrows;

Fig. 3 is a sectional view on an enlarged scale of the synchronizing apparatus as shown in Fig. 1;

Fig. 4 is a sectional view of a portion of the apparatus as shown in Fig. 3 showing the "cocked" position of the apparatus preparatory to its automatic operation;

Fig. 5 is a cross-sectional view on a slightly enlarged scale showing the construction of the trigger member which forms a part of the apparatus illustrated in Figs. 3 and 4;

Fig. 6 is a sectional view taken on the line VI—VI of Fig. 3 and looking in the direction indicated by the arrows;

Fig. 7 is a sectional view taken on the line VII—VII of Fig. 3 and looking in the direction indicated by the arrows, and Fig. 8 is a schematic diagram showing the electrical circuit employed in the present apparatus as well as other circuit arrangements which may be utilized when desired.

Referring now to the drawings in detail the device shown in Fig. 1 comprises a metal casing 5 which houses a pair of dry cell batteries 6 and 7 (Fig. 3) and supports a socket 8 for receiving the base 9 of a photoflash lamp 10.

A reflector 12 is adjustably supported by a bracket 13 secured to the casing so as to direct the light emitted by the photoflash lamp 10.

The socket 8 comprises a block of suitable insulating material secured to the inner wall of the tubular casing and a pair of co-axially aligned screws or the like 14 and 15 pass inwardly of the block leaving a short spacing between their tapered ends, as shown in Figs. 3, 7, and 8. The head of the lower screw 15 engages the terminal of the battery 6 and retains a metal contact strip 16 in place. As will be noted from Fig. 7, this strip is provided with a metallic terminal 17 projecting into a recess provided in the insulated block and aligning with a transverse bore 18 so as to be engaged by a metallic jack or plug, as hereinafter more fully described. A similar strip 19 (Fig. 6) provided with a terminal 20 projecting into a recess and aligning with a transverse bore 22, has its other end secured to the interior of the metal casing by a connecting screw 23 (Fig. 3).

The upper screw 14 likewise secures a connecting strip 24 in place as well as a spring contact 25 which is engaged by the center contact of the photoflash lamp 10. The strip 24 is also provided with terminals 26 and 27 projecting into recesses and aligning with transverse bores 28 and 29 in the same manner as previously described respecting the strips 16 and 19. By reference to Fig. 8 it will thus be seen that the terminal 20 of the strip 19 carries negative polarity from the batteries 6 and 7, while that of the strip 16 and terminal 17 is of a positive polarity as are the terminals 26 and 27 upon connection of the two screws 14 and 15. Thus by inserting suitable connecting jacks into the various transverse bores 18, 22, 28 and 29, the socket 8 can be connected to a remote control push button 30 and to an additional remotely disposed photoflash lamp 32 as shown by the dotted lines in Fig. 8.

However, since the entire synchronizing apparatus is usually directly controlled a switch is provided which, as shown, comprises a slidable insulated shaft 33 having a metallic tapered point 34 so as to engage the tapered ends of the screws 14 and 15 upon depression of a button 35. A compression spring 36 returns the switch to its normal opened position and in order to prevent the accidental depression thereof a finger operated pivoted lock 37 (Fig. 2) is moved under the button 35. Accordingly, upon rotation of the lock 37 from beneath the button 35 and depression of the latter, the photoflash lamp 10 is energized since positive polarity from the batteries 6 and 7 is transmitted to the center contact of the lamp through the screws 14 and 15, switch contact 34 and spring contact 25 while negative polarity is transmitted through the metallic casing 5 and a metallic spring lamp release 38 passing through a slot 39 and engaging the shell of the base 9.

The mechanism for operating the camera shutter includes a bracket 40 adjustably secured to the casing 5 as by set screws or the like 42 (Fig. 1). This bracket supports a housing 43 for a plunger 44 and a solenoid 45. As will be noted from Fig. 3, the plunger 44 threadedly engages a sleeve 46 slidable in the tubular portion of the housing 43, and passes through a block forming a bearing 47. A compression spring 48 is disposed between the bearing 47 and the end of the sleeve 46 so that potential energy is stored therein upon retraction of the plunger as shown in Fig. 4.

For the purpose of holding and releasing the plunger 44 and its sleeve 46, the sleeve is provided with a notch 49 for engagement with a trigger member 50 as shown in Fig. 4. The trigger is in the nature of a bell-crank member having arms 50' and 50" and is movable about a pivot pin 53. A suitable spring 52 serves to hold the trigger under operative tension.

As shown one arm 50' of the trigger is so disposed as to constitute an armature and is normally held against one end of a threaded rod 54 threadedly engaged in a bore in the housing 43. The other end of the rod 54 is provided with a slot for convenient adjustment and a set screw 54' is provided to lock the stop in an adjusted position. The other arm 50" which may be termed the latch-arm, is so disposed as to engage notch 49 when the plunger 44 is retracted as shown in Figs. 4 and 5.

When the solenoid is energized the armature arm 50' of the trigger is moved with a consequent movement of the latch arm 50" in opposition to the spring 53 to release the plunger. The degree of movement of the trigger is important and the stop member 54 may be adjusted to change the air gap of the armature. Thus the device may be so regulated as to provide an accurate synchronization between the opening of the camera shutter and the peak of the flash. In addition to the adjustment attainable by the adjustable stop 54 the core of the solenoid is provided with a threaded hub 51' threadedly engaged with a bracket arm and having a slot for convenient rotation to move the core relative to the armature. A lock nut 51 is provided to hold the solenoid core in its adjusted position.

A metal sheathed cable release 55 extends from a camera shutter 56 (Fig. 1) in the customary manner and at its free end is rotatably secured to a threaded bushing or the like 57, such as by means of a set screw 58, to increase flexibility of the cable release about the synchronizing apparatus. The bushing 57 is threaded into the end of the tubular portion of the housing 43 and a locknut 59 enables an adjustment of the connection of the cable release to the apparatus. A compression spring 60 surrounding the wire of the cable release maintains the end of the latter in a predetermined position which, in the released position of the synchronizing apparatus, is against the sleeve 46. Electrical energy for the winding of the solenoid is supplied by a conductor 62 having a connecting jack 63 engaging the transverse bore 28 of the socket 8, while the other end of the solenoid winding is grounded to the metal housing as at 64. Consequently upon depression of the button 35 both the lamp 10 and solenoid 45 are energized from the batteries 6 and 7.

The mechanism thus far described and enclosed within the housing 43 differs very little from that shown and claimed in my above noted patent. However, in my prior patent, the plunger is completely withdrawn from its housing and remains in such position until released. Thus there is the ever present possibility of its being caught in some manner to prevent its movement even when released with the result that the shutter will not be opened despite flashing of the lamp thereby not only wasting a lamp but perchance losing the picture.

Another inherent disadvantage resides in the fact that in the construction shown in my prior patent the armature or trigger release engages a stop on the plunger which is under a comparatively strong tension. This requires considerable electrical energy from the batteries to move the armature against its frictional engagement with the stop and the potential energy stored in the shutter actuating member.

To eliminate these disadvantages, the end of the plunger 44 opposite to the engagement of the cable release therewith, is surrounded by a sleeve 65 having a hand knob 66 carried thereby. This sleeve slides within the tubular portion of the housing 43 and normally rests against the bearing 47. The internal diameter of the sleeve is sufficient to allow its free movement longitudinally of the housing until the head 67 carried by the plunger engages a shoulder 68. Between the head 67 of the plunger and the end of the sleeve 65 is a coil spring 69 which is normally compressed due to the potential energy of the stronger spring 48.

In order to "cock" the apparatus the operator grips the knob 66 and withdraws the sleeve from the housing 43. When the sleeve has moved until the shoulder 68 engages the plunger head 67 thus compressing the spring 69 still further, the plunger 44 is likewise withdrawn which slides the sleeve 46 until the solenoid armature 50 engages the notch 49. Movement of the sleeve 46 accordingly compresses the spring 48 and relieves the tension on the spring 69 so that upon release of the knob 66 the expansion of the spring 69 causes the sleeve 65 to slide again into the housing 43. The mechanism is thus "cocked" ready for release which thus registers a red colored portion of the sleeve 46 with a window 70 (Fig. 1) to indicate such condition to the operator.

For the purpose of reducing the frictional engagement of the solenoid armature 50 with the sleeve 46, it will be noted from Fig. 5 that the end of the armature is of slightly arcuate configuration drawn from an exact radius extending from the pivot point 53. The notch 49 in the sleeve 46 is provided with a surface corresponding substantially to the same radius as the armature so that frictional engagement therebetween is reduced to a minimum requiring very little energy by the spring 52 to hold the armature in the notch.

When the solenoid is energized by depression of the button 35 to thus simultaneously energize the lamp 10 very little electrical energy is required to cause retraction of the armature against the tension of the armature spring 52. Upon counter-clockwise rotation of the armature about its pivot 53 the arcuate end slides uniformly over the surface of the notch 49 which neither aids nor detracts from movement of the sleeve 46 and its integral plunger 44.

Accordingly when the armature end moves completely out of the notch 49 the potential energy stored in the spring 48 causes the plunger 44 and sleeve 46 to move with great rapidity from the "cocked" position as shown in Fig. 4 to their normal position shown in Fig. 3. In returning to its normal position the end of the sleeve 46 strikes the end of the wire of the cable release 55 pushing the wire against the tension of the spring 60 to thereby open the camera shutter 56 with the spring 69 serving to cushion the impact.

At the same time a blue indication or other suitable color registers with the window 70 (Fig. 1) to show that the apparatus is in the "exposed" position. Due to the adjustment of the air-gap of the armature 50 and the position of the camera cable release in the casing 43, which is regulated by the locknut 59, the time required for the mechanism to open the shutter can thus be made equal to that from the instant of energizing the lamp 10 or 32 until it reaches its peak intensity, thereby attaining complete synchronization.

It thus becomes obvious to those skilled in the art that a synchronizing apparatus is herein provided wherein all moving parts are so concealed that during automatic operation for the taking of a film exposure there is no possibility of its being accidentally caught in the clothes of the operator or its operation in any way impaired. Moreover, due to the provision of a trigger member which moves uniformly and is readily controllable, frictional engagement is reduced to a minimum thus decreasing the amount of electrical energy required to initiate operation of the apparatus and prolonging the life of the electrical source.

By the provision of a socket having recessed terminals for the reception of jack connectors various other controls or lamps can be readily connected to the apparatus as desired. The lamp can also be very quickly removed from the socket merely by depression of the thumb spring release enabling rapid replacement for a succeeding picture.

Although one specific embodiment of the present invention has been herein shown and described it is to be understood that other modifications thereof may be made without departing from the spirit and scope of the appended claims.

What is claimed is:

1. A synchronizing apparatus for opening a camera shutter simultaneously with flashing of a photoflash lamp comprising a casing, a shutter actuating member within said casing, means for storing potential energy upon a movement of said member, a setting member enclosing said shutter actuating member in all positions of the latter to prevent interference with the free movement of said actuating member and said setting member being operably connected to said shutter actuating member and operable to move said shutter actuating member and cause the storage of potential energy in said means, a solenoid having an armature arranged to constitute a trigger member for holding said shutter actuating member ready for operation, means for returning said setting member to its normal position within said casing upon release by an operator, and means operable to simultaneously energize a photoflash lamp and said solenoid to cause release of said trigger with attendant movement of said shutter actuating member within a predetermined period of time and opening of a camera shutter at substantially the moment of peak intensity from the photoflash lamp.

2. A synchronizing apparatus for opening a camera shutter simultaneously with flashing of a photoflash lamp comprising a casing, a shutter actuating member within said casing, means for storing potential energy upon a movement of said member longitudinally of said casing, a setting member extending into said casing enclosing said shutter actuating member in all positions of the latter to prevent interference with the free movement of said actuating member and said setting member being operably connected to said shutter actuating member and operable upon withdrawal thereof from said casing to move said shutter actuating member and cause the storage of potential energy in said means, a solenoid having an armature arranged to constitute a trigger member for holding said shutter actuating member ready for operation, means for returning said setting member into said casing upon release by an operator, and means operable to simultaneously energize a photoflash lamp and said solenoid to cause release of said trigger with attendant movement of said shutter actuating member within a predetermined period of time to cause opening of a camera shutter at substantially the moment of peak intensity from the photoflash lamp.

3. A synchronizing apparatus for opening a camera shutter simultaneously with flashing of a photoflash lamp comprising a casing, a shutter actuating member within said casing, means for storing potential energy upon a movement of said member longitudinally of said casing, a setting member telescopically engaging said casing and said shutter actuating member and enclosing the latter in all positions thereof to prevent inadvertent interference with the free movement of said actuating member, and said setting member being operable upon movement to extended position to move said shutter actuating member with attendant storage of potential energy in said means, a solenoid having an armature arranged to constitute a trigger member for holding said shutter actuating member ready for operation after movement by said setting member, means connected to said setting member for returning the same into telescoped position within said casing upon release by an operator, and means operable to simultaneously energize a photoflash lamp and said solenoid to cause release of said trigger with attendant movement of said shutter actuating member within a predetermined period of time to cause opening of a camera shutter at substantially the moment of peak intensity from the photoflash lamp.

4. A synchronizing apparatus for opening a camera shutter simultaneously with flashing of a photoflash lamp comprising a casing, a shutter actuating member within said casing, means for storing potential energy upon movement of said member, a setting member enclosing said shutter actuating member in all positions of the latter to prevent interference with the free movement of said actuating member, and said setting member being operably connected to said shutter actuating member for moving the latter with attendant storage of potential energy in said means, means for returning said setting member to its normal position within said casing upon release by an operator, a solenoid having a pivoted armature provided with an arcuate end drawn with a radius from the pivot point and engageable with a surface of corresponding curvature on said shutter actuating member for holding the latter with a minimum of friction ready for operation, and means operable to simultaneously energize a photoflash lamp and said solenoid to cause the uniform disengagement of the end of said armature from the surface of corresponding curvature without aiding or detracting from the movement of said shutter actuating member in opening a camera shutter within a predetermined period of time and at substantially the moment of peak intensity from the photoflash lamp.

5. A synchronizing apparatus for opening a camera shutter simultaneously with flashing of a photoflash lamp comprising a casing, a plunger within said casing adapted to engage a camera cable release upon movement in one direction, a spring cooperating with said plunger and operable to store potential energy therein upon movement of said plunger in an opposite direction longitudinally of said casing, a sleeve enclosing said plunger in all positions of the latter to prevent inadvertent interference with the free movement of said plunger and said sleeve being movable relative to said plunger and provided with a finger piece externally of said casing for moving said sleeve to an extended position, a spring operably connecting said plunger and said sleeve to cause movement of said plunger upon movement of said sleeve to extended position and for returning said sleeve to its normal telescopic position within said casing upon release of said finger piece, a solenoid having an armature arranged to constitute a trigger member for holding said plunger ready for operation against the tension of said first mentioned spring, and means operable to simultaneously energize a photoflash lamp and said solenoid to cause release of said trigger with attendant movement of said plunger into engagement with said camera cable release within a predetermined period of time to cause opening of a camera shutter at substantially the moment of peak intensity from the photoflash lamp.

6. A synchronizing apparatus for opening a camera shutter simultaneously with flashing of a photoflash lamp comprising a casing, a plunger within said casing provided with a sleeve adapted to engage a camera cable release upon movement in one direction, a spring cooperating with said plunger and operable to store potential energy therein upon movement of said plunger and sleeve in an opposite direction longitudinally of said casing, a second sleeve surrounding a portion of said plunger in all positions of the latter and movable relative thereto and provided with a finger piece externally of said casing for moving said sleeve to an extended position, a second spring operably connecting said plunger and said second sleeve to cause movement of said plunger upon movement of said second sleeve to extended position and for returning the latter to its normal telescopic position within said casing upon release of said finger piece, a solenoid having a pivoted armature provided with an arcuate end drawn with a radius from the pivot point and engageable with a notch in said first mentioned sleeve having a surface of corresponding curvature for holding said plunger with a minimum of friction ready for operation, and means operable to simultaneously energize a photoflash lamp and said solenoid to cause the uniform disengagement of the armature end from said notch without aiding or detracting from the movement of said plunger with attendant engagement thereof with said camera cable release and opening of a camera shutter within a predetermined period of time and at substantially the moment of peak intensity from the photoflash lamp.

SAMUEL MENDELSOHN.